US006564251B2

(12) United States Patent
Katariya et al.

(10) Patent No.: US 6,564,251 B2
(45) Date of Patent: *May 13, 2003

(54) SCALABLE COMPUTING SYSTEM FOR PRESENTING CUSTOMIZED AGGREGATION OF INFORMATION

(75) Inventors: Sanjeev Katariya, Issaquah, WA (US); Alok K. Sinha, Redmond, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,592

(22) Filed: Dec. 3, 1998

(65) Prior Publication Data

US 2002/0091789 A1 Jul. 11, 2002

(51) Int. Cl.[7] .............................................. G06F 15/167
(52) U.S. Cl. ........................ 709/214; 709/218; 709/219
(58) Field of Search ................................ 709/213, 214, 709/215, 216, 217, 218, 219, 231, 232; 707/104, 523, 513

(56) References Cited

U.S. PATENT DOCUMENTS

| | | | | |
|---|---|---|---|---|
| 5,740,430 A | | 4/1998 | Rosenberg et al. ......... 707/200 |
| 5,761,662 A | * | 6/1998 | Dasan ..................... 707/104.1 |
| 5,894,554 A | * | 4/1999 | Lowery et al. ......... 707/104 X |
| 5,913,033 A | | 6/1999 | Grout ......................... 709/219 |
| 5,924,116 A | | 7/1999 | Agarwal et al. ............ 711/122 |
| 5,933,849 A | | 8/1999 | Srbljic et al. ............... 711/118 |
| 5,983,227 A | * | 11/1999 | Nazem et al. .......... 707/104 X |

(List continued on next page.)

FOREIGN PATENT DOCUMENTS

| | | | |
|---|---|---|---|
| EP | 0 674 281 A1 | * | 9/1995 |
| EP | 0 848 338 A1 | * | 6/1998 |
| WO | 98/37667 | * | 8/1998 |

OTHER PUBLICATIONS

ISAPI: Internet Server API, MAr. 1997, http://www.webopedia.com, 2 pages.*
Simon St. Laurent, XML: A Primer, http://corpitk.earthweb.com/, M&T Books, IDG Worldwide, Inc., Mar. 1998. 4 pages.*
Dean Povey et al., A Distributed Internet Cache, Feb. 1997, Proceedings of the 20th Australasian Computer Science Conference, 10 pages.*
Anawat Chankhunthod, et al., A Hierarchial Internet Object Cache, Computer Science Department of University of Southern Califorina, 11 pages, Nov. 1995.

(List continued on next page.)

*Primary Examiner*—Patrice Winder
(74) *Attorney, Agent, or Firm*—Banner & Witcoff, Ltd.

(57) ABSTRACT

A method and computing system for providing a highly reliable web site that is capable of handling millions of Internet users per day. The computing system is customizable on a per user basis yet seamlessly aggregates data from a number of information providers, such as news services, weather services, stock services, personal email, and even a community specific service. The computing system includes a plurality of personalization stores that maintain personalization data for a corresponding Internet user. The computing system is based on a federated model in which a single entry point spans to a plurality of web servers. Each web server has an aggregation module, such as an Internet Server API (ISAPI) filter, that retrieves user-specific data "clips" from the personalization store and passes the data to one or more provider objects. The provider objects receive data from the information providers and render the data to form the data clips according to the personalization data retrieved from the personalization store.

33 Claims, 5 Drawing Sheets

U.S. PATENT DOCUMENTS

| | | | | |
|---|---|---|---|---|
| 5,995,943 A | * | 11/1999 | Bull et al. | 709/217 X |
| 6,029,182 A | * | 2/2000 | Nehab et al. | 707/523 |
| 6,065,058 A | * | 5/2000 | Hailpern et al. | 709/231 |
| 6,154,811 A | * | 11/2000 | Srbljic et al. | 711/118 |
| 6,192,382 B1 | * | 2/2001 | Lafer et al. | 707/513 |
| 6,249,795 B1 | * | 6/2001 | Douglis | 707/511 |
| 6,293,402 B1 | | 7/2001 | Ronstrom et al. | 711/131 |
| 6,278,449 B1 | * | 8/2001 | Sugiarto et al. | 709/203 |

OTHER PUBLICATIONS

Evangelos P. Markatos, et al., a Top–10 Approach to Prefetching the Web, INET 98, 15 pages, Jul. 1998.

Ton Verschuren, et al., Web Caching Meshes: Hit or Miss? INET 98, 17 pages, Jul. 1998.

* cited by examiner

SCALABLE COMPUTING SYSTEM FOR PRESENTING CUSTOMIZED AGGREGATION OF INFORMATION

FIELD OF THE INVENTION

This invention relates generally to information systems and more particularly to a computing system having a scalable architecture that is capable of providing customized information to millions of users.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

BACKGROUND OF THE INVENTION

The Internet is a worldwide collection of networks that span over 100 countries and connect millions of computers. In 1997 traffic on the Internet doubled every 100 days. At the end of 1997, more than 100 million people were using the Internet. Reports indicate that the Internet is growing faster than all preceding information technologies including radio and television. The World Wide Web (WWW) is one of the fastest growing facets of the Internet and represents the computers that support the hypertext transfer protocol (HTTP) which is a common protocol for exchanging information.

Because there is no central authority controlling the WWW, finding useful information within the WWW can be a daunting task. In an effort to ease this burden, specialized software, referred to as robots or crawlers, have been developed. These crawlers traverse the WWW in order to collect information and generate a searchable catalog. By searching the generated catalogs, Internet users are often able to find information that otherwise would have been impossible to locate. Although these catalogs can be of great assistance to an Internet user, the catalogs suffer from many deficiencies. For example, because of the amount of time required for the crawler to traverse even a portion of the WWW, the information in the catalog is often out of date. Furthermore, the resulting catalogs are so voluminous that the user is often overwhelmed with the search results, which can exceed tens of thousands of matches.

For the reasons stated above, and for other reasons stated below which will become apparent to those skilled in the art upon reading and understanding the present specification, there is a need in the art for a computing system that provides Internet users with relevant, user-specific information by seamlessly aggregating information from a variety of information providers.

SUMMARY OF THE INVENTION

A computing system has been developed that provides Internet users with a customizable, aggregation of user-specific data, thereby obviating the need for users to endlessly search the WWW for information. The computing system aggregates information from a number of information providers, such as news services, weather services, stock services, personal email, and even community specific services. Because the information is rendered and aggregated in a user-specific fashion, each user therefore has a "home" or individual "portal" on the WWW at which the user's most desired information is located.

The massively scalable computing system provides a highly reliable web site that is capable of handling millions of Internet users per day. The computing system includes a plurality of personalization stores that maintain personalization data for corresponding Internet users. In one embodiment, the computing system is based on a federated model in which a single entry point spans to a plurality of web servers executing Internet Information Server (IIS) on the Windows NT operating system. In another embodiment, each web server has an aggregation module, such as an Internet Server API (ISAPI) filter, that retrieves user-specific data from the personalization store and passes the data to one or more provider objects. The provider objects receive data from the information providers and render the data according to the personalization data retrieved from the personalization store. The aggregation module negotiates the layout of customized pages for each user based on the corresponding rendered data received from the provider objects.

According to one feature of the invention, each page of the site is stored in large file store and is defined in Extensible Markup Language (XML) and Extensible Style Language (XSL). In this manner, the content of each page can be enhanced by the rendered data from the provider objects, thereby adding dynamic behavior to the predefined page. According to another feature, the computing system implements a distributed cache in order to increase performance.

DETAILED DESCRIPTION OF THE INVENTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. The first section describes the hardware and the operating environment that are suitable for use within the inventive computing system described below. The second section provides a detailed description of the inventive computing system. The third section provides methods for operating an exemplary embodiment of the invention. Finally, the fourth section provides a conclusion of the detailed description.

Hardware and Operating Environment

Figure 1:
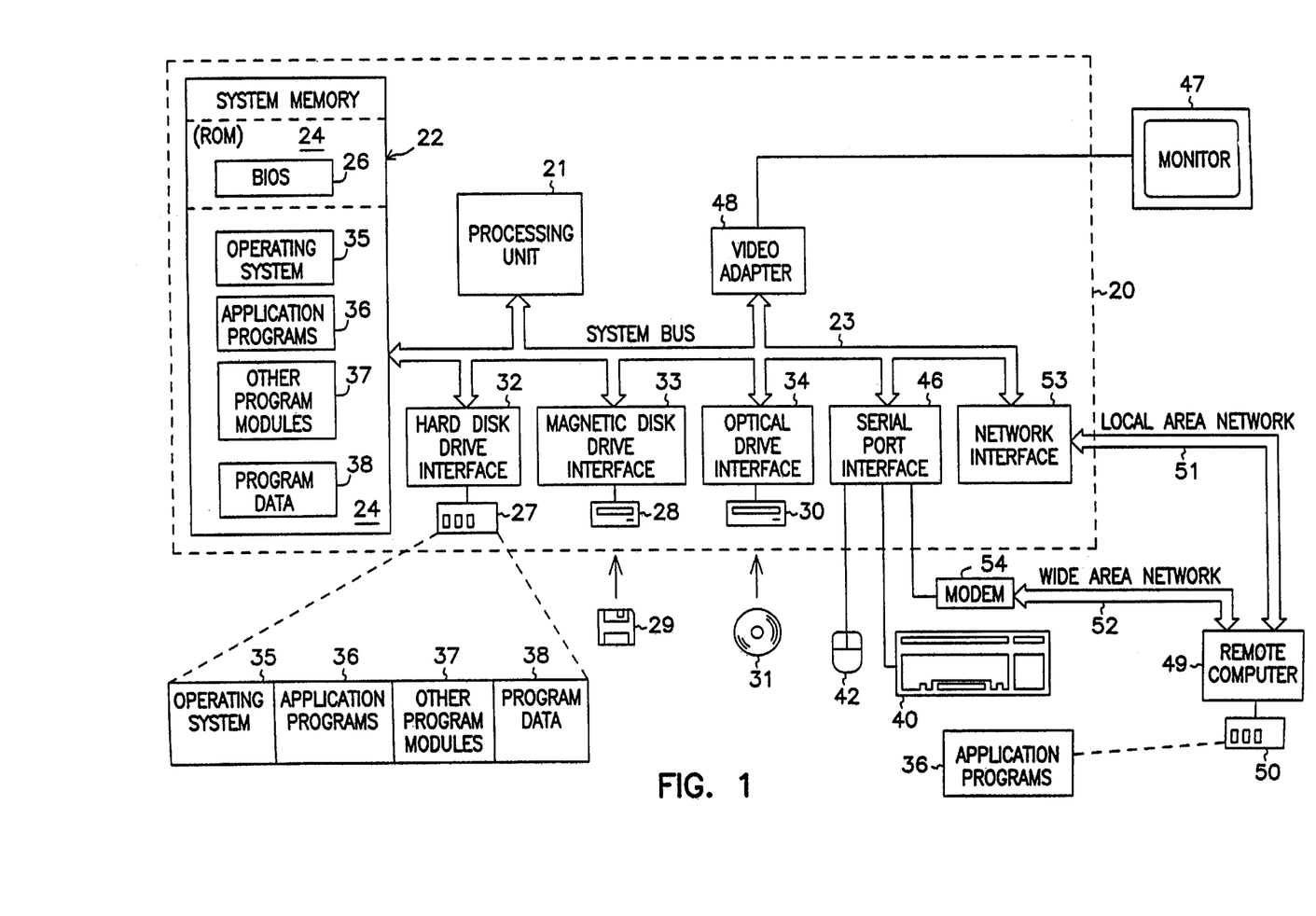
FIG. 1 shows a diagram of the hardware and operating environment of a suitable computer in conjunction with which embodiments of the invention may be practiced.

FIG. 1 is a diagram of computer having hardware and operating environment suitable for various embodiments of the invention. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

The exemplary hardware and operating environment of FIG. 1 for implementing the invention includes a general purpose computing device in the form of a computer 20 having processing unit 21, system memory 22, and system bus 23 that operatively couples various system components including system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. Basic input/output system (BIOS) 26 contains routines that help to transfer information between elements within computer 20, such as during start-up, and is stored in ROM 24. Computer 20 further includes hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored by hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to processing unit 21 through serial port interface 46 that is coupled to the system bus, but may be connected by other interfaces, such as a parallel port, game port, or a universal serial bus (USB). Monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
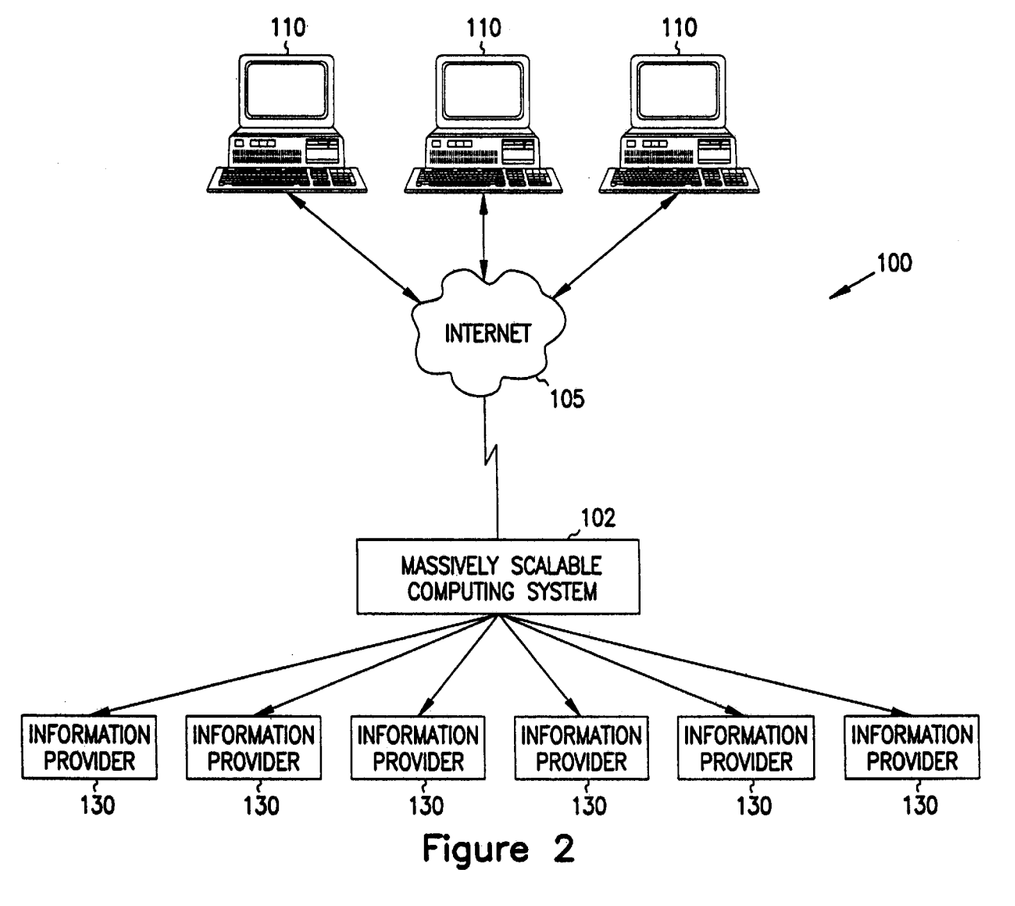
FIG. 2 is a block diagram illustrating a massively scalable computing system which provides Internet users personalized information from a variety of information providers.

FIG. 2 is a block diagram illustrating a computing environment 100 in which a massively scalable computing system 102 provides Internet users. 110 personalized information from a variety of information providers 130. Computing system 102 seamlessly aggregates information from information providers 130 and presents the aggregation to users 110. Information providers 130 represent any source of information and may include news services, weather services, financial services, etc. In addition, information providers 130 may provide user-specific information to web-site 102 such as community-specific information and even personal email. Copending and coassigned patent application Ser. No. 09/205,127, filed Dec. 3, 1998, entitled "Web page Rendering Architecture", describes various embodiments of computing system 102. The invention is not necessarily so limited, however.

As described in detail below, computing system 102 is based upon an architecture that is capable of handling millions of user requests each day. Even though computing system 102 handles such large volumes of requests, the architecture of computing system 102 allows each user 110 to "personalize" the aggregation presented by computing system 102. More specifically, each user 110 is able to select any number of information providers 130 from which to receive information. Furthermore, computing system 102 tailors the information received from the selected information providers 130 specifically for the requesting Internet user 110. In order to present a "personalized" aggregation of information, computing system 102 stores specific personalization data for each user 110. When users 110 access computing system 102 via Internet 105, computing system 102 retrieves the corresponding personalization data and aggregates information from information providers 130 based on the retrieved personalization data.

Figure 3:
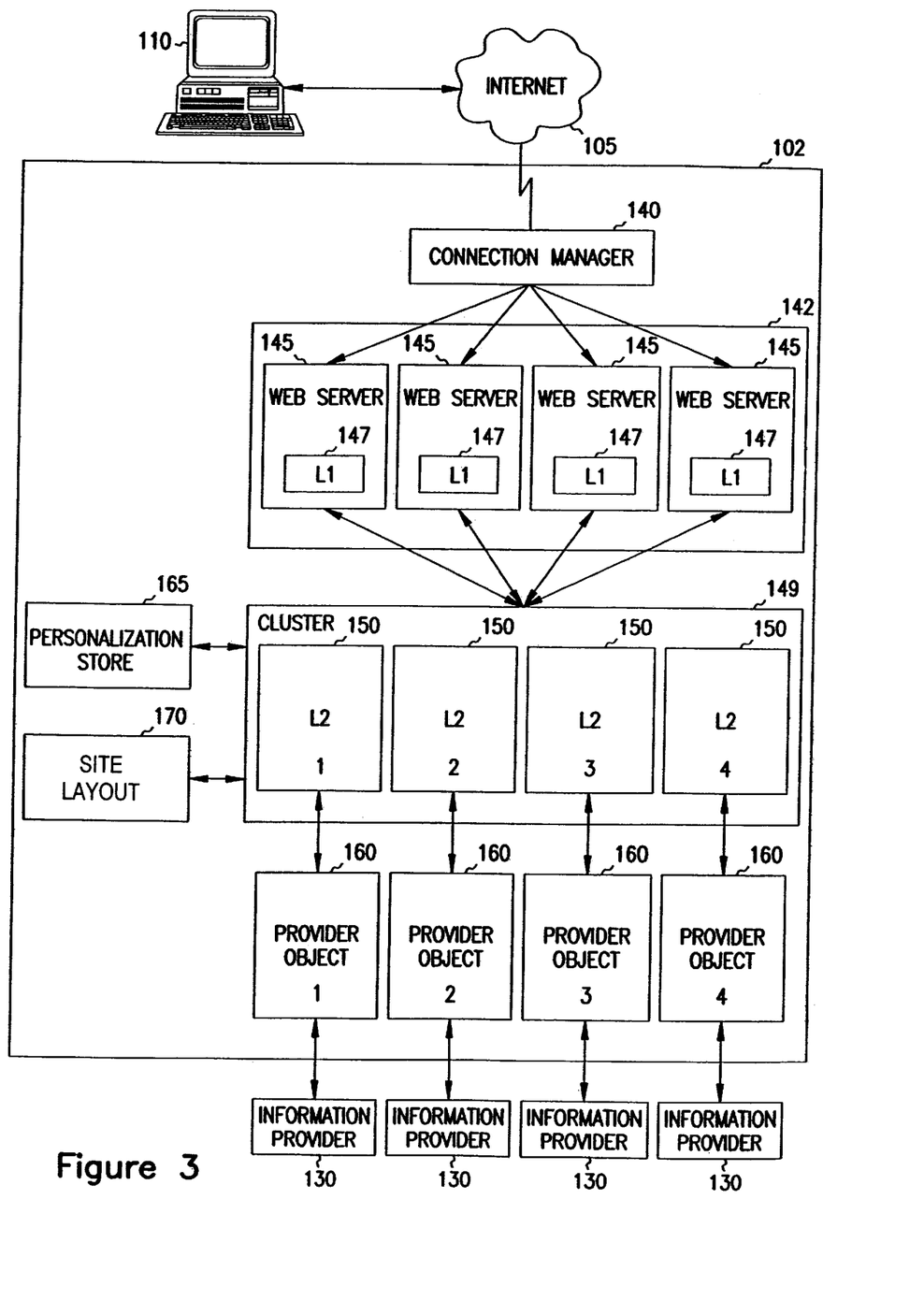
FIG. 3 is a block diagram illustrating one embodiment of the computing system of FIG. 2 that provides a seamless aggregation of information received from the information providers.

FIG. 3 is a block diagram illustrating one embodiment of computing system 102 for presenting users 110 with a seamless aggregation of information received from information providers 130. In order to access computing system 102, Internet user 110 connects to Internet 105 via a standard browser such as Microsoft's Internet Explorer. Using the browser, user 110 issues a request to establish a communication session with computing system 102. The request indicates a corresponding WWW address for computing system 102 such as "home.microsoft.com." Connection manager 140 receives the request and selects a web server 145 from cluster 142 to handle the communication session. Based on this selection, connection manager 140 translates the WWW address into a fixed Internet Protocol (IP) address for the selected web server 145. In this manner, computing system 102 may easily be scaled to handle more Internet users 110 by adding web servers 145.

Upon establishing the communication session, the selected web server 145 accesses site layout 170 that defines the overall layout and presentation of information by computing system 102. More specifically, site layout 170 includes descriptions for each page presented to user 110 by computing system 102 including which information providers 130 are supported. Next, selected web server 145 accesses a corresponding personalization store 165 for Internet user 110 and retrieves personalization data specific to Internet user 110. Additional personalization data may be stored locally at each Internet user 110 in the form of a cookie.

In one embodiment the contents of site layout 170 and personalization store 165 are defined in Extensible Markup Language (XML) and Extensible Style Language (XSL) that are currently being developed by the WWW Consortium (W3C). Like HTML, XML is rooted in the Standard Generalized Markup Language (SGML). XML, however, does not require the use of a fixed document type. For example, using XML, industries can create their own customized markup languages for exchanging information. XSL is a specification for separating style from content. Using XSL, style templates can be created for application to multiple XML pages. Defining site layout 170 and personalization store 165 in XML and XSL yields an extensible architecture for computing system 102. For example, in personalization store 165, XML can be used to describe necessary parameters for retrieving user-specific data from information providers 130. The use of XML and XSL allows these parameters to be easily changed.

After retrieving the personalization data from personalization store 165, the selected web server 145 issues a request for appropriate data "clips" based on the user-selected information providers 130 as indicate by the retrieved personalization data. Each data clip is one or more personalized pages of rendered data containing information from the appropriate information provider 130.

Computing system 102 implements a distributed caching scheme in order to quickly provide data clips to Internet user 110. First, web server 145 examines local first-level (L1) cache 147. If the clip exists in the local cache 147, web server 145 immediately communicates the data clip to user 110. If the clip does not exist within L1 cache 147, a request having the user-specific personalized data is issued to cluster 149 of second-level (L2) cache servers 150. If the requested clip exists on one of the L2 cache servers 150 then it will be added to the L1 cache and communicated to user 110 by web server 145. If the requested clip is not found in within the L2 cache servers 150, the request if forward to an appropriate provider object 160.

In one embodiment, the caching scheme is a high-performance distributed cache. Desirably, the caching scheme is efficient, such that search time decreased, the ability to handle higher peak load per machine is increased, and the cost per search is reduced (indicating high locality within the cache). Also desirably, the caching scheme is fast, robust (having a minimum number of external failures resulting in the failure of the cache), complete (such that all highly recurring query results are stored), current (no item stays in the cache longer than a given time limit, unless otherwise specified), intelligent (having flexible caching policies), and reusable (that is, scalable).

In one particular embodiment, the caching scheme is based on a threading model, such that multiple user threads are allowed. In addition, the caching scheme utilizes an indexing model known in the art as a direct-chained caching model; the cache content has a limited lifetime (record expiration model); the caching scheme is also based on a record access model providing for record protection (locking) when multiple threads add, read, delete and update index entries in parallel; and, the caching scheme utilizes data compression; the cache has very intensive heap memory use.

Each provider object 160 provides an interface for a corresponding information provider 130. More specifically, provider objects receive data from information providers 130 and render the data into data clips according to the user-specific personalization data. These data clips are then communicated to the requesting user 110 and added to one or more L2 cache servers 150 and L1 local cache 147. For example, a weather provider object 130 returns a weather data clip based upon data retrieved from the corresponding personalization store 165 such as a zip code for the requesting user 110. Other examples of provider objects include a stock provider object, a generic HTML provider object and a generic XML provider object. The generic HTML provider object returns an HTML formatted clip while the generic XML provider object returns an XML formatted clip.

In the above described manner, cluster 149 of cache servers 150 and provider objects 160 provide a highly efficient means for receiving and rendering data from a variety of information providers 130. In this manner, computing system 102 may,easily be scaled to handle more information providers 130 by adding cache servers 150. Furthermore, additional provider objects 160 may be added to computing system 102 without requiring modification of web servers 145 or cache servers 150.

Figure 4:
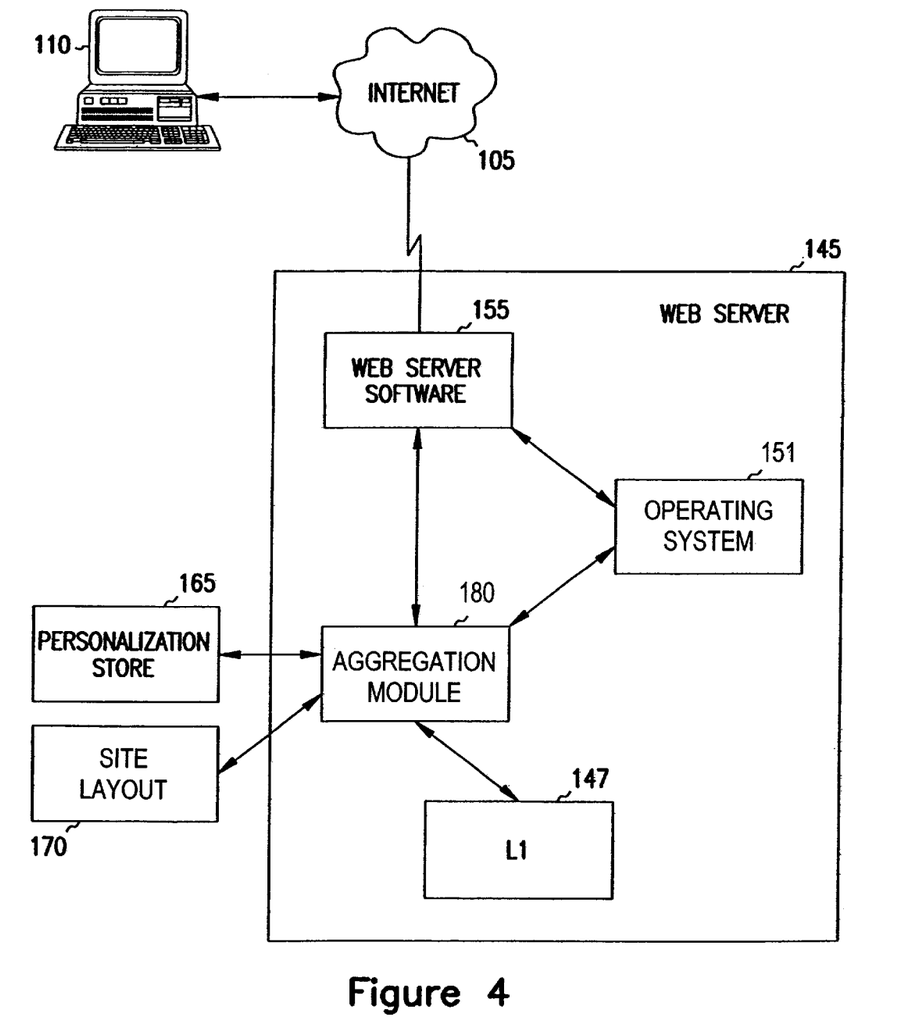
FIG. 4 is a block diagram illustrating one embodiment of a web server operating according to the invention.

FIG. 4 is a block diagram illustrating one embodiment of a web server 145 operating according to the invention. Server 145 includes operating system 151, web server software 155 and aggregation module 180. In one embodiment, operating system 151 is Microsoft Windows NT and web server software 155 is Microsoft's Internet Information Server (IIS).

Web server software 155 communicates the aggregation to the requesting user 110. If the browser of requesting user 110 is XML-capable, web server software 155 communicates the aggregation in XML format, otherwise, web server software 155 communicates the aggregation in HTML format.

In conventional systems, a web server responds to many user requests by invoking Common Gateway Interface (CGI) executable files. These systems create a new process for each request, which is time-consuming and requires large amounts of memory. Computing system 102 avoids this performance degradation because, in one embodiment, aggregation module 180 conforms to the Microsoft Internet Application Programming Interface (ISAPI), which is a high-performance alternative to CGI executable files. In this embodiment, aggregation module 180 is implemented as an ISAPI filter. As an ISAPI filter, aggregation module 180 is a dynamic-link library (DLL) which web server software 155 invokes whenever there is an HTTP request from user 110. In this embodiment, aggregation module 180 is loaded by web server software 155 the first time an HTTP request is received from user 110. Web server software 155 keeps aggregation module 180 in memory to service other requests, thereby avoiding the performance degradation of conventional systems.

Methods of an Exemplary Embodiment of the Invention

In the previous section, a system level overview of the operation of exemplary embodiments of the invention was described. In this section, the particular methods performed by the exemplary embodiments are described by reference to a flowchart. The methods to be performed by the embodiments constitute computer programs made up of computer-executable instructions. Describing the methods by reference to a flowchart enables one skilled in the art to develop such programs including such instructions to carry out the methods on suitable computing systems from computer-readable media.

Figure 5:
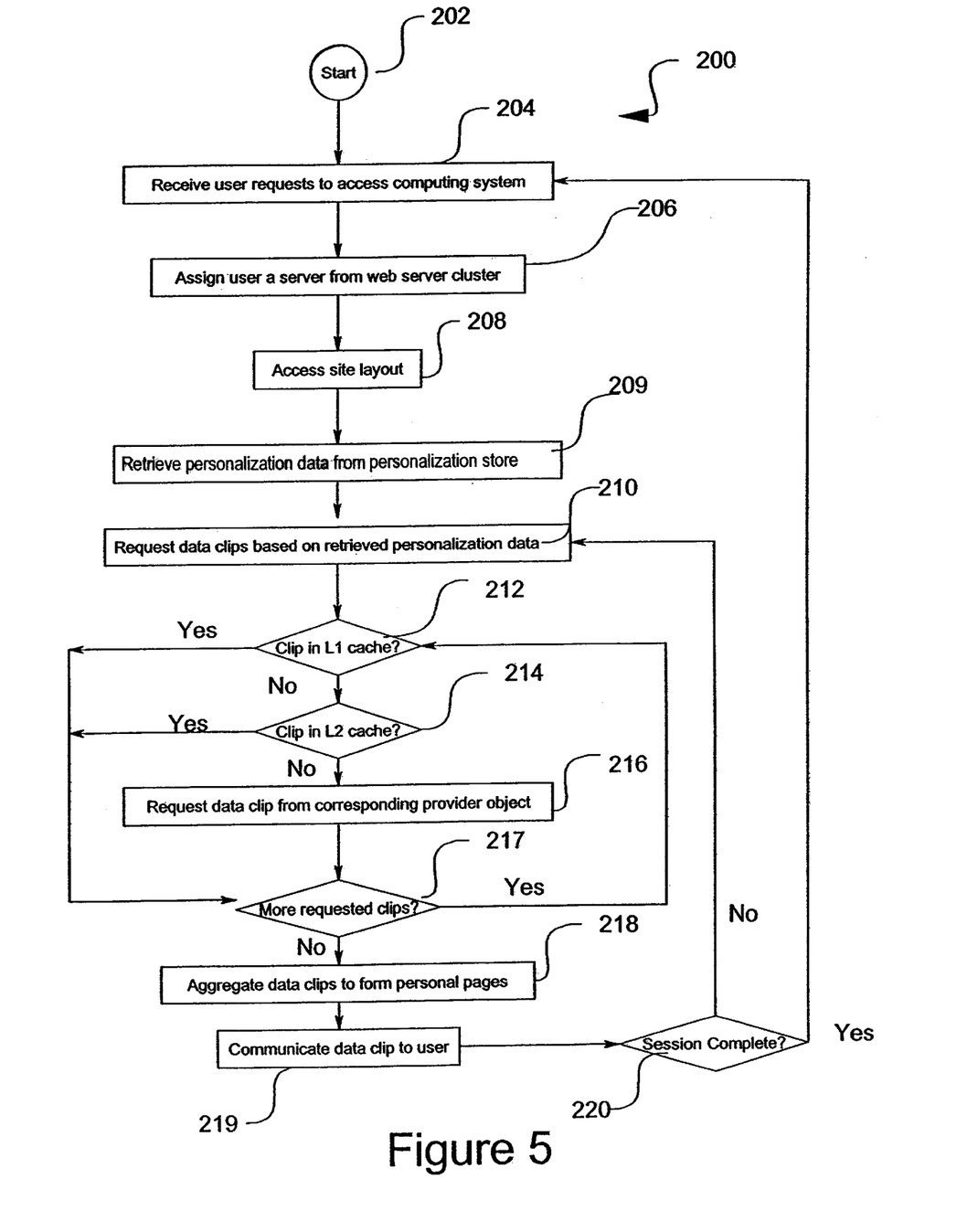
FIG. 5 is a flowchart illustrating one mode of operation of a computing system performing the inventive method.

FIG. 5 illustrates a flowchart of one exemplary method of operation of the above-described computing system. In order to provide Internet users personalized information from a variety of information providers, computing system 102 (FIG. 2) begins with step 202, immediately proceeds to step 204 and waits for user requests to initiate a communication session. When a request is received, computing system 102 proceeds to step 206 and selects a web server 145 from web server cluster 142 to handle the current session. In step 208, the selected web server 145 retrieves site information from site layout 170. Site layout 170 includes descriptions for each page presented to user 110 by computing system 102 including which information providers 130 are supported. Next, in step 209, the selected web server 145 accesses a corresponding personalization store 165 for the Internet user 110 and retrieves user-specific personalization data.

In step 210, web server 145 issues a request for a data "clip" based on the user-selected information providers 130 as indicated by the personalization data retrieved in step 209. If the requested data clip exists in the local (L1) cache of web server 145, computing system 102 jumps to step 217 and immediately communicates the data clip to user 110. If the clip does not exist within L1 cache 147, the request is forwarded to cluster 149 of second-level (L2) cache servers 150 in step 214. If the requested clip exists on one of the L2 cache servers 150 then computing system 102 adds the clip to the L1 cache of the selected web server 145 and jumps to step 217. If the requested clip is not found within the L2 cache servers 150, computing system 102 proceeds to step 216 and requests the clip from an appropriate provider object 160.

In step 216, the appropriate provider object 160 forms the data clip by rendering data received from the corresponding information provider 130. The provider object 160 renders the data clip as a function of the personalization data retrieved in step 209. The data clip is then added to one or more L2 cache servers 150 and L1 local cache 147.

Upon receiving the requested data clip, computing system 102 proceeds to step 217 and determines if more data clips are necessary. If so, computing system 102 returns to step 212 and repeats steps 212, 214 and 216. If not, computing system 102 proceeds to step 218 where aggregation module 180 aggregates the received data clips to form one or more user-specific pages. In step 219, computing system 102 communicates the formed pages to Internet user 110.

Next, computing system 102 proceeds to step 220 and determines if user 110 wishes to terminate the communication session. If not computing system 102 returns to step 210 and repeats steps 212 through 219. If the user wishes to terminate the session, computing system 102 returns to step 204 and waits for user requests.

The particular methods performed by computing system 102 of various exemplary embodiments of the invention have been described. The method performed by computing system 102 has been shown by reference to a flowchart including all the steps from 202 through 222.

Conclusion

A method and system for quickly and reliably presenting Internet users with a seamless aggregation of information received from a variety of information providers have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that in one embodiment the computing system is based on a federated model in which a single entry point spans to a plurality of web servers. The invention includes an aggregation module that quickly and efficiently aggregates personalized information. In one embodiment the aggregation module is implemented as a high-speed ISAPI filter that is invoked by web server software to handle requests from the Internet users. In addition, the invention facilitates an extensible computing system that may be easily modified. For example, in one embodiment the layout of the site and the personalization parameters are defined in Extensible Markup Language (XML) and Extensible Style Language (XSL). In addition, the computing system achieves greater efficiencies by presenting Internet users with information in XML and XSL format if the user has an XML-capable browser. Therefore, is manifestly intended that this invention be limited only by the following claims and equivalents thereof.

We claim:

1. A computing system for aggregating information for a user from a plurality of information providers, said computing system comprising:
   a personalization store maintaining personalized data for the user;
   a plurality of provider objects rendering user-specific data from the information providers based on the personalized data retrieved from said personalization store;
   a server including a first-level cache for storing at least a first portion of said user-specific data, said server for aggregating said user-specific data into one or more pages and communicating said one or more pages to the user; and
   a cluster of second-level cache servers for caching at least a second portion of said user-specific data.

2. The computing system of claim 1 wherein the server includes an aggregation module for retrieving the personalized data from the personalization store and for requesting said data clips from the provider objects.

3. The computing system of claim 1 wherein the aggregation module conforms to the Internet Server Application Programming Interface.

4. The computing system of claim 1 wherein the server comprises a web server.

5. The computing system of claim 4, wherein the web server communicates said data clips to the user via the Internet.

6. The computing system of claim 1, wherein each of said provider objects includes a third-level cache for storing the rendered data.

7. The computing system of claim 1, wherein the personalization data within the personalization store is defined in Extensible Markup Language (XML).

8. The computing system of claim 1, further including a site layout module defining the layout and presentation of the pages.

9. The computing system of claim 8, wherein the site layout module is defined in Extensible Markup Language (XML).

10. The computing system of claim 1, wherein the personalized data is not encoded in a template, a template being a predetermined hyper-text markup language encoded document.

11. A computing system for providing an aggregation of information from a plurality of information providers to a plurality of users, said computing system comprising:
   a plurality of personalization stores, wherein personalized data for each user is maintained in one of said personalization stores;
   a plurality of provider objects rendering data from a corresponding information provider based on the personalized data of the users;
   a plurality of web servers, each said web server including a first-level cache, wherein each of a plurality of users is assigned to a corresponding web server of the plurality of web servers, wherein for each user the respective web server:
      (a) retrieves the personalized data from the corresponding personalization store,
      (b) commands the provider objects to render data as a function of the retrieved personalized data,
      (c) stores the corresponding rendered data in said corresponding first-level cache,
      (d) aggregates the rendered data to form one or more pages, and
      (e) communicates the one or more pages to the corresponding user; and
   a cluster of second-level cache servers for caching the rendered data.

12. The computing system of claim 11, wherein the web server further includes an aggregation module for retrieving the corresponding personalized data from the personalization store and for requesting the rendered data from the provider objects as a function of the retrieved personalized data.

13. The computing system of claim 11, wherein each of said provider objects includes a third-level cache for storing the rendered data.

14. The computing system of claim 11, wherein the personalization data within the personalization store is defined in Extensible Markup Language (XML).

15. The computing system of claim 11, further including a site layout module defining the layout and presentation of the pages.

16. The computing system of claim 15, wherein the site layout module is defined in Extensible Markup Language (XML).

17. The computing system of claim 11, wherein the personalized data is not encoded in a template, a template being a predetermined hyper-text markup language encoded document.

18. A computing method for presenting users an aggregation of information received from a plurality of information providers comprising:
   receiving a user request to receive information from the plurality of information providers;
   retrieving personalized data from a corresponding personalization store for the requesting user;
   rendering data from the plurality of information providers based on the retrieved personalized data;
   storing the rendered data in at least one of a first-level cache and a cluster of second-level cache servers;
   aggregating the rendered data to form one or more pages; and
   communicating the one or more pages to the requesting user.

19. The computing method of claim 18, wherein rendering the data includes the step of determining whether the rendered data is stored by the cluster of second-level cache servers.

20. The computing method of claim 18, wherein the personalized data is defined in Extensible Markup Language (XML).

21. The computing method of claim 18, wherein aggregating the rendered data includes accessing a site layout module that defines the layout and presentation of the pages.

22. The computing method of claim 21, wherein the site layout module is defined in Extensible Markup Language (XML).

23. The computing method of claim 18, wherein the personalized data is not encoded in a template, a template being a predetermined hyper-text markup language encoded document.

24. The computing method of claim 18, wherein retrieving personalized data from a corresponding personalization store further comprises:

retrieving personalized data from a corresponding personalization store and additional personalization data stored locally at the requesting user.

25. The computing method of claim 24, wherein the additional personalization data further comprises additional personalization data having the form of a cookie.

26. A computer-readable medium having computer-executable instructions to a cause a computing system to perform a method comprising the steps of:

receiving a user request to receive information from a plurality of information providers;

retrieving personalized data from a corresponding personalization store for the requesting user;

rendering the information into data as a function of the retrieved personalized data;

storing the rendered data in at least one of a first-level cache and a cluster of second-level cache servers;

aggregating the rendered data to form one or more pages; and communicating the one or more pages to the requesting user.

27. The computer-readable medium of claim 26, wherein rendering the data includes determining whether the rendered data is stored by the cluster of second-level servers.

28. The computer-readable medium of claim 26, wherein the personalized data is defined in Extensible Markup Language (XML).

29. The computer-readable medium of claim 26, wherein aggregating the rendered data includes accessing a site layout module that defines the layout and presentation of the pages.

30. The computer-readable medium of claim 29, wherein the site layout module is defined in Extensible Markup Language (XML).

31. The computer-readable medium of claim 26, wherein the personalized data is not encoded in a template, a template being a predetermined hyper-text markup language encoded document.

32. The computer-readable medium of claim 26, wherein retrieving personalized data from a corresponding personalization store further comprises:

retrieving personalized data from a corresponding personalization store and additional personalization data stored locally at the requesting user.

33. The computer-readable medium of claim 32, wherein the additional personalization data further comprises additional personalization data having the form of a cookie.

* * * * *